United States Patent [19]
Carruth et al.

[11] Patent Number: 4,926,951
[45] Date of Patent: May 22, 1990

[54] WEIGH BED

[75] Inventors: Walter L. Carruth, Cordova; Warren P. Jones, Memphis, both of Tenn.; Richard B. Stacy, Charleston, S.C.

[73] Assignee: SSI Medical Services, Inc., Charleston, S.C.

[21] Appl. No.: 371,611

[22] Filed: Jun. 26, 1989

[51] Int. Cl.⁵ .................. G01G 19/52; G01G 3/08; G01G 21/24
[52] U.S. Cl. .................. 177/144; 177/229; 177/255; 177/DIG. 9
[58] Field of Search ............ 177/229, 255, DIG. 9, 177/144

[56] References Cited

U.S. PATENT DOCUMENTS

| | | | |
|---|---|---|---|
| 4,134,467 | 1/1979 | Czyryk | 177/255 X |
| 4,286,679 | 9/1981 | Schneider | 177/255 X |
| 4,411,327 | 10/1983 | Lockery et al. | 177/DIG. 9 |
| 4,554,987 | 11/1985 | Dillon | 177/DIG. 9 |
| 4,600,066 | 7/1986 | Griffen et al. | 177/229 X |
| 4,793,428 | 12/1988 | Swersey | 177/144 |

OTHER PUBLICATIONS

"Patient Bed Scales", Feb. 1984 Health Devices, pp. 75-91.

Primary Examiner—George H. Miller, Jr.
Attorney, Agent, or Firm—Wood, Herron & Evans

[57] ABSTRACT

A weigh bed has a rectangular base frame, a rectangular weigh frame mounted above the base frame, a load cell beam mounted on each corner of the weigh frame and a ball connecting each load cell beam to the base frame. Three tie rods connected between the base frame and weigh frame limit horizontal movement of the weigh frame with respect to the base frame.

9 Claims, 3 Drawing Sheets

WEIGH BED

This invention relates to a weigh scale, and more particularly, to a weigh scale associated with a hospital bed.

BACKGROUND OF THE INVENTION

In scales generally, it is conventional to mount a weigh frame above a base and rigidly connect load cells between the weigh frame and the base. As subject matter to be weighed is placed on the weigh frame, the stressing of the load cells, through the application of the weight, causes the load cells to generate an electrical signal proportional to the weight applied to the load cells. The loads measured by respective load cells are summed to provide the measure of the weight of the subject matter mounted on the scale.

The rigid or substantially rigid connection between the base and the weigh frame is satisfactory where the base is fixed with respect to ground. But where the scale is to be moved from place to place on a regular basis, or where the load is applied in diverse directions or attitudes, thereby introducing force vectors that are not parallel to the force of gravity, the rigid mounting of the weigh frame with respect to the base frame will introduce errors. Any twist of the weigh frame with respect to the base frame will cause binding at the load cell. The frictional force of the binding will be seen as weight that is either added to or subtracted from the true weight, but in any event, will introduce error.

A hospital bed having provision for weighing a patient is an example of the type of scale environment that causes error. This is particularly true in relation to special critical care-type beds that are leased for limited periods, returned, and leased again for use at another site. The frequent movement of the bed from one site to another compounds the problems referred to above. A ground support that is not essentially perpendicular to the force of gravity introduces a twist of the weigh frame with respect to the base frame causing error. The position of the patient—for example, consider a patient in an inclined trendelenburg position—changes the vector of the load on the load cell. Any change from a strictly vertical application of the load, that is, parallel to the force of gravity, introduces error.

BRIEF SUMMARY OF THE INVENTION

It has been an objective of the present invention to provide a scale structure, particularly useful in a hospital bed, that minimizes error. Whereas in conventional scales an error of 1 pound in 5,000 is considered to be satisfactory, the present invention limits error to about 1 pound in 20,000. The error is held to a minimum notwithstanding the surface on which the bed is mounted or the deviation from horizontal of the attitude of the patient on the bed.

The objective of the present invention is attained by connecting a weigh frame to a base by four load cells, one at each corner of the base. Each load cell is fixed to the weigh frame and connected to the base frame by means of balls. Each ball engages a plane surface on the base. The four-ball contact provides assurance that if the patient is supported at an angle to the weigh frame, or if the base is supported at an angle other than horizontal, there will be no twist imparted to the load cells which would introduce an error into the combined reading of the load cells.

But, the weigh frame must be laterally confined with respect to the base frame, for otherwise the ball contact would permit the weigh frame to roll off the base frame when the bed is in transport or when the bed is at an angle to horizontal. This problem is solved by providing a three-tie rod connection between the base frame and the weigh frame. Preferably, two tie rods are mounted across each opposite end of the bed and one tie rod is mounted on one side of the bed parallel to the longitudinal axis of the bed. The three-tie rod configuration greatly facilitates assembly. In this respect, a loose analogy to a four-legged stool versus a three-legged stool is appropriate. The three-legged stool is easily leveled to the ground without rocking. A four-legged stool requires very precise measurement and assembly of the legs to assure that the four ends of the legs lie in the same plane. Otherwise, the four-legged stool will rock. So it is with three tie rods. Four tie rods would appear to be the obvious approach. Four tie rods require great time and care in adjustment to avoid stressing the load cells. A three tie rod connection is much simpler to install and maintain and has proved to provide the requisite security.

BRIEF DESCRIPTION OF THE DRAWINGS

The several objectives and features of the present invention will become more readily apparent from the following detailed description taken in conjunction with the accompanying drawings in which.

DETAILED DESCRIPTION OF THE DRAWINGS

Figure 1:
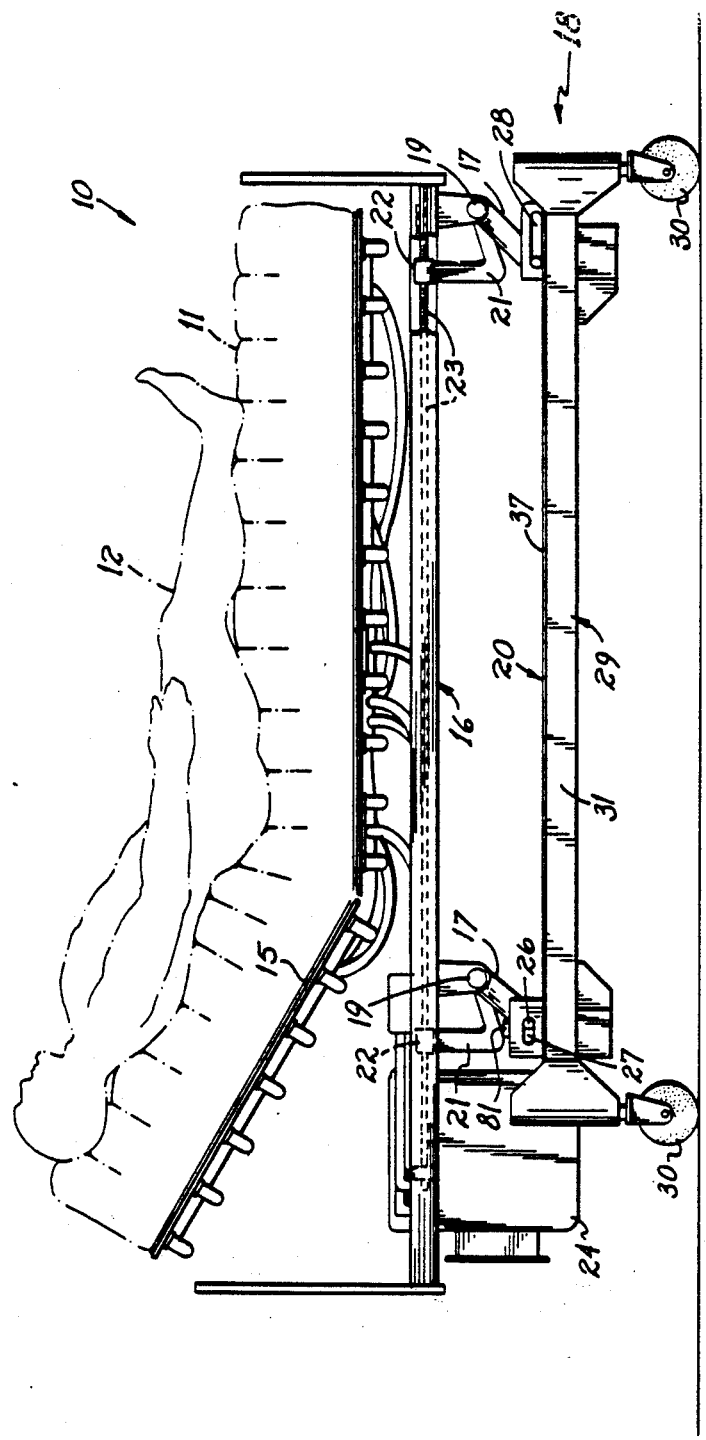
FIG. 1 is a side elevational view of the bed including the weigh frame.

A bed 10 is shown in FIG. 1, the bed having an air mattress 11 by which a patient 12 is supported. The bed 10 includes an articulated patient support 15 which is mounted on a bed frame 16. The bed frame 16 is connected by parallelogram lift arms 17 to the lower bed structure 18. All of the mechanism, including drive motors and the like for operating the bed and manipulating the patient support panels to change the attitude of the patient, are mounted on the bed frame 16. That mechanism includes the motor mechanism for raising and lowering the bed frame 16 with respect to the lower structure 18. The lift arms 17 connect the bed frame and superstructure to the weigh frame 20 which forms a part of the lower structure 18.

Each lift arm 17 is fixed to a shaft 19. Each shaft 19 is fixed at one end to an L-lever 21. The other end of the L-lever has a nut 22 through which a screw 23 passes. The screw is rotated by a motor in a housing 24 to raise and lower the bed frame 16.

Rollers 26 are mounted on the lower ends of the lift arms 17. The rollers are mounted in horizontal slots 27 and 28 at the head and foot ends of the base frame 29. Slots 28 facilitate shifting the bed frame to a trendelenburg position. Slots 27 accommodate any slight warping of the frame as the bed is raised and lowered Such warping would, but for the slots, cause a binding that affects the weight reading.

Preferably, a U-shaped bracket 25 is fixed between the lower ends of the lift arms 17 to allow adequate side-to-side motion of the lift arms to prevent binding of the frame, while at the same time controlling the side-to-side motion so that the rollers never fall out of the supporting brackets.

The weigh frame 20 is connected to a base frame 29 only by four load cells, as will be described. Thus, it can be seen that all of the superstructure, weighing approximately 700 pounds, is supported above the weigh frame 20. Any change of the angle of the patient's body with respect to the bed frame will not affect at all the force of the load cells on the base frame because of the ball connection of weigh frame to base frame, as will be described. The base frame 29 is mounted on casters 30 so that the bed can easily be rolled from place to place. That transport of the bed of course introduces the possibility of error which is accommodated by the manner of mounting of the weigh frame to the base frame.

Figure 2:
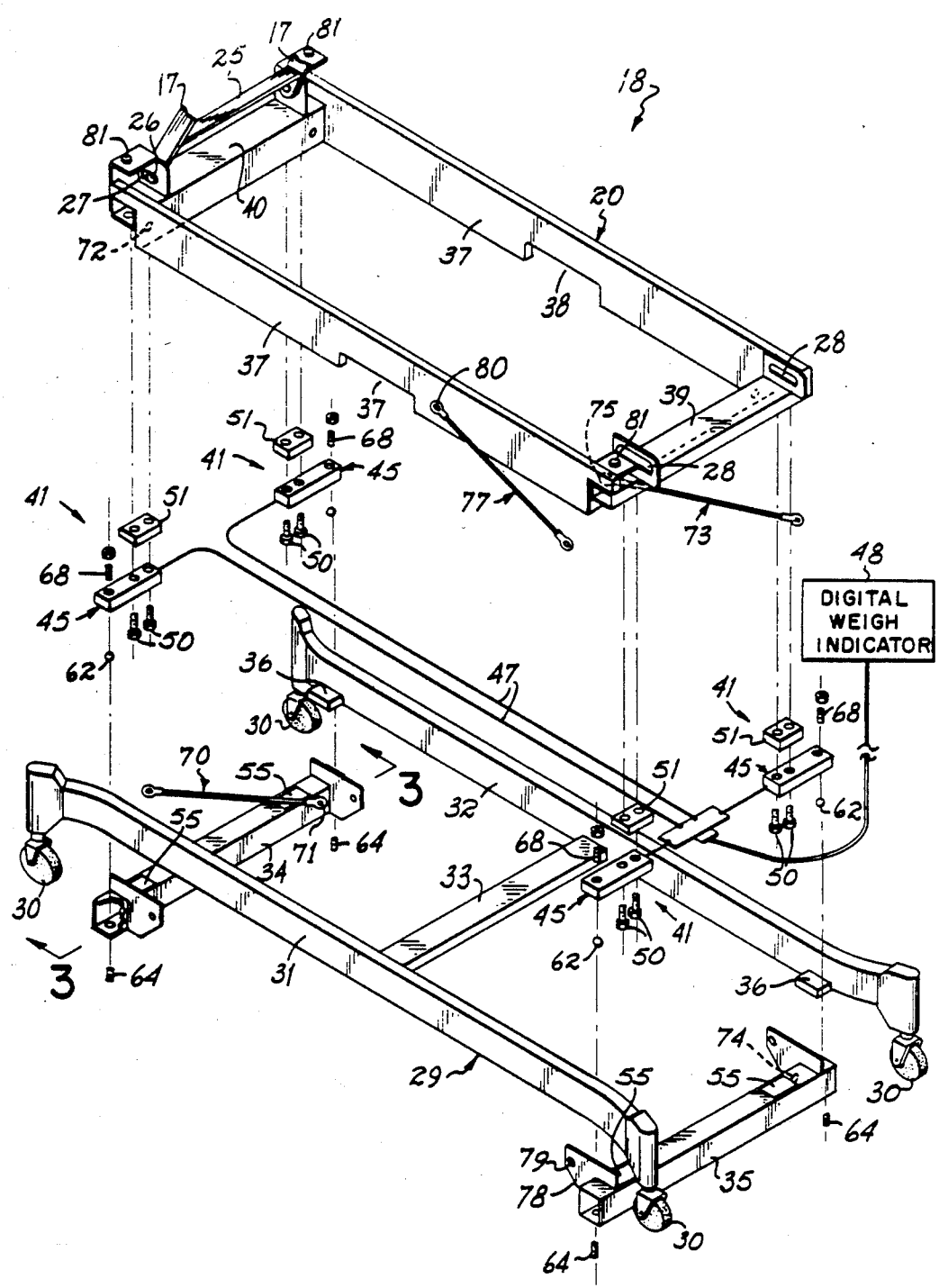
FIG. 2 is a disassembled, perspective view of the weigh frame and base frame.

The mounting of the weigh frame 20 to the base frame is best illustrated in FIG. 2. The base frame has two longitudinal members 31 and 32 which are joined together at the center by a transverse brace 33. Rectangular, tubular cross members 34 and 35 are fixed across the ends of the longitudinal members 31 and 32 to provide a secure rectangular base frame that will not twist horizontally. The tubular members 34 and 35 can be welded or bolted to lugs 36 at the ends of the longitudinal frame members The weigh frame 20 is likewise a rectangular member having two longitudinal members 37. Intermediate their ends, the longitudinal members 37 are recessed as at 38 to accommodate the central brace 33 when the weigh frame is nested within the base frame. Rectangular tubes 39 and 40 are welded across the ends of the longitudinal members 37 to provide a rigid rectangular weigh frame structure.

Figure 3:
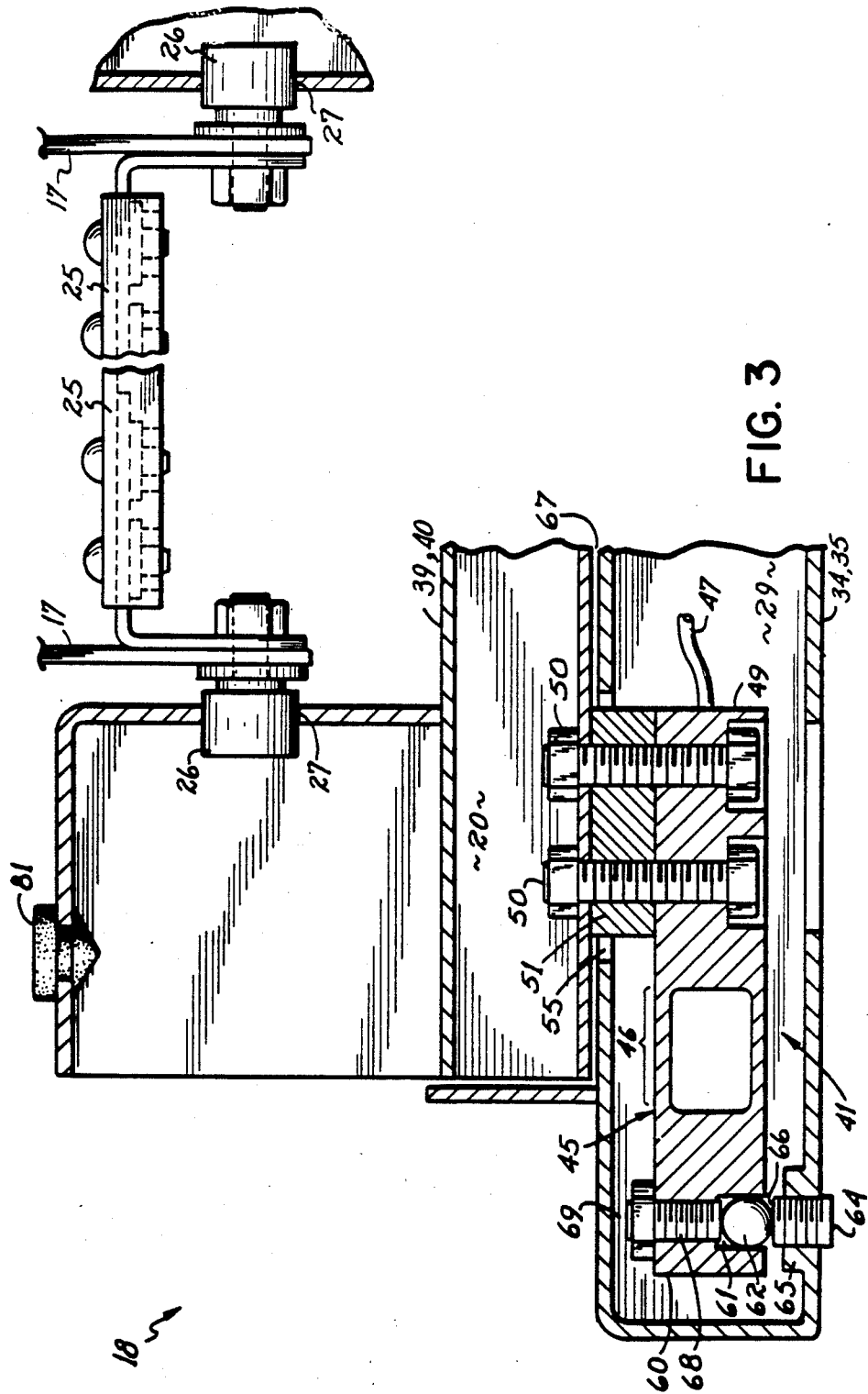
FIG. 3 is a fragmentary cross-sectional view of one load cell connection between weigh frame and base frame.

The weigh frame is mounted on the base frame by means of load cells 41 at each corner of the weigh and base frames. The load cells are identical to each other. One of the load cells is best illustrated in FIG. 3. The load cell includes a rectangular beam 45 on which strain gauges 46 are mounted. All strain gauges are electrically connected by conductors 47 to a digital weight indicator 48. The weight indicator can be of the type disclosed in copending application Ser. No. 07/138,829, filed Dec. 28, 1987.

Each beam 45 is bolted at one inboard end 49 to the weigh frame 20 by a pair of bolts 50. The bolts sandwich a spacer 51 between the beam 45 and the weigh frame 20. The tubular end members 34, 35 of the base frame 29 have openings 55 through which the spacer 51 passes, thereby connecting the weigh frame 20 to the load cells 41 free of any contact with the base frame 29.

The other, outboard, end 60 of the beam 45 has a bore or recess 61. A hardened steel ball 62 is freely positioned in the bore 61. About a 0.005 inch clearance is provided between ball and bore to facilitate slight rolling. A threaded seat 64 is threaded into a boss 65 in the tubular end members 34, 35 of the base frame. The seat 64 has a hardened surface 66 which is engaged by the ball 62. The ball 62 provides what is essentially a rolling contact with the surface 66. Visually, it can be observed that the ball rolls a small fraction of an inch in all directions around the hardened surface 66 of the seat 64.

An overload stop is created by the weigh frame and base frame surfaces forming gap 67 at each corner of the frames. A vertical motion stop is formed by screw 68 threaded in the end 60 of the beam 45 and contacting ball 62. The size of vertical motion gap 69 between screw 68 and cross member 34, 35 may be varied by rotation of the threaded seat 64. Closing gap 69 opens overload gap 67. It is preferred to set overload gap 67 to about 200% overload capacity or about 1,000 pounds at each corner so that the weigh frame will bottom out on the base frame when the load at any corner exceeds about 1000 pounds.

Since the rolling ball contact is the only contact between the weigh frame and the base frame, a system of tie rods is required to keep the weigh frame from moving horizontally with respect to the base frame. To this end, an end tie rod 70 is connected across one end between the base frame at 71 and the weigh frame at 72. At the opposite end, a tie rod 73 is connected to the corner of the base frame at 74 which is at the same side of the bed as the connection at 71 of tie rod 70. Tie rod 73 is connected to the weigh frame at 75. These "same side" connectors reduce twisting of the weigh frame with respect to the base frame. Finally, a longitudinal tie rod 77 is connected between a flange 78 on the base frame at bolt hole 79 and the weigh frame at 80. Rubber transport stops 81 are provided as cushioning between the superstructure and the weigh frame during transportation of the bed.

In operation, the bed 10 can be moved from place to place. The tie rods 70, 73 and 77 will keep the weigh frame securely in position on the base frame, or more precisely, will keep the balls 62 at the four corners of the weigh frame continuously resting on the seats 64 of the base frame. The ball support of the weigh frame provides freedom of motion on the two horizontal axes. The balls isolate all forces from the load cell except gravity. Each ball maintains the point of loading constant and, hence, a constant lever formed by the beam 45.

If the base frame is not perfectly level with respect to horizontal, there will be no binding of the connection of the weigh frame with respect to the base frame because of the pure ball connection between the two. Similarly, if the patient's position is shifted as, for example, to a trendelenburg position or a reverse trendelenburg position, there will be no effect whatsoever on the accuracy of the weight transmitted by the load cells since all force vectors will be resolved into vertical force vectors by the ball connections to the ball seats between the load beam and the base frame.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A scale comprising:
   a base,
   a weigh frame mounted above said base,
   four laterally and longitudinally spaced load cell beams fixed at one end to said weigh frame,
   a ball supporting each said beam for rolling movement on said base,
   and means limiting movement of said weigh frame with respect to said base in three axes.

2. A scale according to claim 1 in which said limiting means includes two spaced, elongated tie rods connecting said frame to said base in a transverse direction and a single elongated tie rod connecting said frame to said base in a longitudinal direction.

3. A hospital bed comprising:
   an elongated, rectangular base frame having four corners,
   casters mounted adjacent said four corners to support said base frame above ground,
   a rectangular weigh frame overlying said base frame and substantially coextensive therewith,
   a load cell beam fixed to each corner of said weigh frame and overlying said base frame,
   a ball interposed between each beam and said base frame to provide the sole vertical support of said weigh frame with respect to said base frame,
   and means limiting movement of said weigh frame with respect to said base frame in three perpendicular axes.

4. A hospital bed as in claim 3 further comprising:
   a bed structure and means for manipulating said bed structure supported on said weigh frame, whereby the force vector of said weigh frame on said base frame will be perpendicular to said base frame, notwithstanding the attitude of said bed structure with respect to said base frame.

5. A hospital bed as in claim 3 in which:
   two load cell beams are mounted at each end of said frame and transversely oriented,
   the connection of each said beam being inboard and the position of said ball being outboard to provide as wide as possible a connection of said weigh frame to said base frame.

6. A hospital bed as in claim 3 in which:
   said base frame has, at each end, a hollow, generally rectangular cross member having top and bottom walls,
   said load cell beam being disposed in said cross member,
   a vertically adjustable screw threaded in said bottom wall at each corner of said base frame, said screw having a hardened upper surface,
   said ball engaging said upper surface.

7. A hospital bed as in claim 6 further comprising:
   a cavity in a downwardly-facing surface of each said load cell beam, said cavity receiving said ball.

8. A hospital bed as in claim 3 in which said movement limiting means comprises:
   an elongated, transverse tie rod at each end of said base frame, each tie rod connected at one end to said base frame and at the other end to said weigh frame,
   and an elongated, longitudinal tie rod connected at one end to said base frame and at the other end to said weigh frame,
   said tie rods limiting movement on two axes.

9. A hospital bed as in claim 8 in which said transverse tie rods are both connected to said base frame on the same side thereof, thereby minimizing any tendency of said weigh frame to twist with respect to said base frame.

* * * * *